US012715417B2

(12) United States Patent
Lee

(10) Patent No.: US 12,715,417 B2
(45) Date of Patent: Aug. 25, 2026

(54) VEHICLE BRAKING SYSTEM AND CONTROL METHOD OF THE SAME

(71) Applicant: HL MANDO CORPORATION, Gyeonggi-do (KR)

(72) Inventor: Yongwoo Lee, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 626 days.

(21) Appl. No.: 18/195,459

(22) Filed: May 10, 2023

(65) Prior Publication Data

US 2023/0365113 A1 Nov. 16, 2023

(30) Foreign Application Priority Data

May 10, 2022 (KR) ........................ 10-2022-0057164

(51) Int. Cl.
*B60T 17/22* (2006.01)
*B60T 7/12* (2006.01)

(52) U.S. Cl.
CPC .............. *B60T 17/221* (2013.01); *B60T 7/12* (2013.01)

(58) Field of Classification Search
CPC .......... B60T 17/221; B60T 7/12; B60T 8/171; B60T 8/245; B60T 2210/20; B60T 2270/402; B60Y 2306/13; B60Y 2400/30; B60Y 2400/81; B60Y 2400/90
See application file for complete search history.

(56) References Cited

U.S. PATENT DOCUMENTS

2007/0029876 A1* 2/2007 Makishima ............... B60T 7/22
303/191

FOREIGN PATENT DOCUMENTS

| | | |
|---|---|---|
| KR | 20-1998-0044932 | 9/1998 |
| KR | 10-1999-0070755 | 9/1999 |
| KR | 10-2011-0080791 | 7/2011 |
| KR | 10-2013-0008360 | 1/2013 |
| KR | 10-2016-0148208 | 12/2016 |
| KR | 10-1735219 | 5/2017 |

OTHER PUBLICATIONS

Japanese Patent No. JP 4715443 published on Jul. 6, 2011.*
Office Action dated Sep. 22, 2025 for Korean Patent Application No. 10-2022-0057164 and its English translation from Global Dossier.

* cited by examiner

*Primary Examiner* — Pamela Rodriguez
(74) *Attorney, Agent, or Firm* — WOMBLE BOND DICKINSON (US) LLP

(57) ABSTRACT

The present disclosure discloses a vehicle braking system and a control method thereof capable of preventing a safety accident during a braking process of a vehicle in which an inclination measurement is impossible, wherein the vehicle braking system includes a braking device, an inclination sensor, and a braking force calculator configured to calculate a target braking force corresponding to the inclination, wherein when the inclination sensor fails to measure the inclination, the braking force calculator sets a target braking force to a preset maximum value, and the braking device reapplies a braking force to the vehicle.

16 Claims, 5 Drawing Sheets

VEHICLE BRAKING SYSTEM AND CONTROL METHOD OF THE SAME

CROSS-REFERENCE TO RELATED APPLICATION

This application claims priority to and the benefit of Korean Patent Application No. 10-2022-0057164, filed on May 10, 2022, the disclosure of which is incorporated herein by reference in its entirety.

TECHNICAL FIELD

The present disclosure relates to a vehicle braking system and a method for controlling the same, and more particularly, to a vehicle braking system and a method for controlling the same capable of preventing a safety accident during a braking process of a vehicle in which an inclination measurement is not possible.

BACKGROUND

The vehicle braking system refers to a system that decelerates or stops a speed of a vehicle being driven.

In a typical vehicle braking system, a braking force may be set differently according to the inclination when parking or stopping the vehicle in an inclined situation. To this end, the typical vehicle braking system includes an inclination sensor that measures an inclination of the vehicle.

However, when the measured value of the inclination sensor is excessively large or the inclination cannot be measured, there is a possibility that a safety accident occurs because a proper braking force is not applied to the vehicle.

Accordingly, development of a vehicle braking system and a control method thereof, in which a safety accident can be prevented in a braking process even when the inclination is equal to or higher than a certain level or the inclination cannot be measured, may be considered.

SUMMARY

Technical Problem

The present disclosure is directed to providing a vehicle braking system and a method for controlling the same capable of preventing a safety accident during a braking process of a vehicle in which an inclination measurement is not possible.

In addition, the present disclosure is directed to providing a vehicle braking system and a method for controlling the same capable of transmitting a warning signal to the outside when there is a possibility that a braking force applied to a vehicle is insufficient.

Technical Solution

In order to achieve the above objects, a vehicle braking system according to an aspect of the present disclosure includes a braking device configured to apply a braking force to a vehicle; an inclination sensor configured to measure an inclination of the vehicle; and a braking force calculator configured to calculate a target braking force corresponding to the inclination, wherein when the inclination sensor fails to measure the inclination of the vehicle, the braking force calculator sets the target braking force to a preset maximum value, and the braking device reapplies a braking force to the vehicle.

In addition, the braking force calculator may compare a measured value of the inclination sensor with a preset reference value, and set the target braking force of the braking device based on the comparison.

In addition, when the measured value of the inclination sensor is equal to or less than the preset reference value, the braking force calculator may set the target braking force to a preset maximum value.

In addition, when the measured value of the inclination sensor is greater than the preset reference value, the braking force calculator may set the target braking force in proportion to the measured value.

In addition, the preset reference value may be 7% or more and 9% or less.

In addition, the vehicle braking system may further include a warning signal transmitter configured to output a warning signal to the outside when the inclination sensor fails to measure the inclination of the vehicle.

In addition, the warning signal transmitter may include a visual signal transmitter configured to output a visual signal.

In addition, the warning signal transmitter may include an auditory signal transmitter configured to output an auditory signal.

In addition, the vehicle braking system may further include a control device controller configured to control the braking device such that when a current speed of the vehicle is greater than a target speed, the speed of the vehicle is decelerated so that the vehicle can be driven at the target speed.

In addition, the vehicle braking system may further include a motor configured to provide power required for driving of the vehicle; and a motor controller configured to control the motor such that the vehicle can be driven at a target speed by accelerating or decelerating the speed of the vehicle.

In addition, the present disclosure provides a method for controlling a vehicle braking system, comprising: (a) measuring, by an inclination sensor, an inclination of a vehicle; (b) calculating, by a braking force calculator, a target braking force corresponding to the inclination; (c) when the inclination sensor fails to measure the inclination of the vehicle, setting, by the braking force calculator, the target braking force to a preset maximum value; and (d) reapplying, by a braking device, a braking force to the vehicle.

In addition, before the step (a), (a01) providing, by a motor, power to the vehicle may be performed so that the vehicle can be driven at a target speed.

In addition, before the step (a), (a02) decelerating, by the braking device, a speed of the vehicle may be performed when a current speed of the vehicle is greater than a target speed.

In addition, the step (b) may include (b0) comparing, by the braking force calculator, a measured value of the inclination sensor with a preset reference value, and setting a target braking force of the braking device based on the comparison.

In addition, the step (b0) may include (b1) setting, by the braking force calculator, the target braking force to a preset maximum value when the measured value of the inclination sensor is equal to or less than the preset reference value.

In addition, the step (b0) may include (b2) setting, by the braking force calculator, the target braking force in proportion to the measured value when the measured value of the inclination sensor is greater than the preset reference value.

In addition, the preset reference value of the step (b0) may be 7% or more and 9% or less.

In addition, the step (c) may include (c1) outputting, by a warning signal transmitter, a warning signal to the outside.

In addition, the step (c0) may include (c01) outputting, by a visual signal transmitter, a visual warning signal.

In addition, the step (c0) may include (c02) outputting, by an auditory signal transmitter, an auditory warning signal.

Advantageous Effects

Among the various effects of the present disclosure, the effects that can be obtained through the above-described solution are as follows.

First, the vehicle braking system includes an inclination sensor configured to measure an inclination of the vehicle; and a braking force calculator configured to calculate a target braking force corresponding to the inclination, When the inclination sensor fails to measure the inclination of the vehicle, the braking force calculator sets the target braking force to a preset maximum value, and the braking device reapplies a braking force to the vehicle.

Therefore, even in a highly inclined situation or a situation where it is difficult to measure the inclination, sufficient braking force can be applied to the vehicle. Accordingly, a safety accident can be prevented during a braking process of the vehicle in which the inclination measurement is not possible. As a result, it is possible to safely brake the vehicle in various inclined situations.

In addition, the vehicle braking system can include a warning signal transmitter. When the inclination sensor fails to measure the inclination of the vehicle, the warning signal transmitter outputs a warning signal to the outside.

Therefore, when an unusual situation such as a malfunction of the inclination sensor occurs, the unusual situation can be quickly transmitted to the driver. Further, the occurrence of an accident due to the unusual situation can be prevented.

DETAILED DESCRIPTION OF THE EMBODIMENTS

Figure 1:
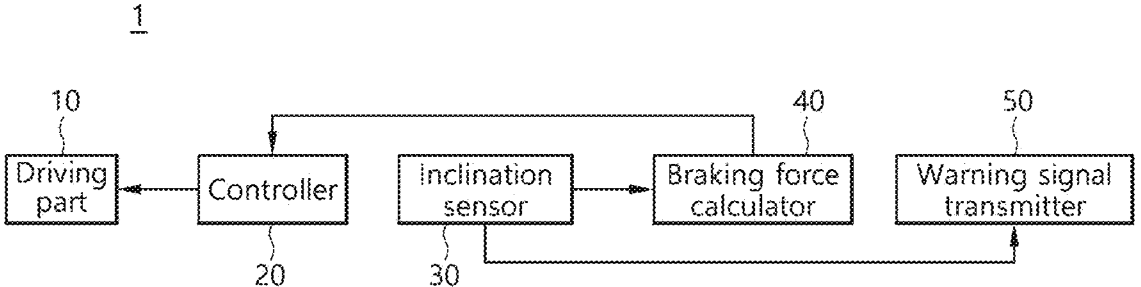
FIG. 1 is a schematic diagram illustrating a vehicle braking system according to an exemplary embodiment of the present disclosure.
Figure 2:
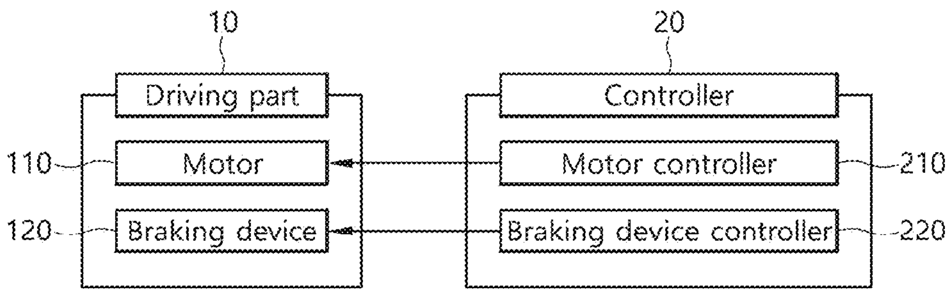
FIG. 2 is a schematic diagram illustrating a driving part and a controller provided in the vehicle braking system of FIG. 1.

Hereinafter, a vehicle braking system 1 and a control method thereof according to an exemplary embodiment of the present disclosure will be described in more detail with reference to the drawings.

In the following description, in order to clarify the features of the present disclosure, descriptions of some components may be omitted.

In this specification, even in different embodiments, the same reference numerals may designate the same elements, and a redundant description thereof will be omitted.

The accompanying drawings are only for easy understanding of the embodiments disclosed herein, and the technical ideas disclosed herein are not limited by the accompanying drawings.

Expressions in the singular include plural expressions unless the context clearly indicates otherwise.

Hereinafter, a vehicle braking system 1 according to an exemplary embodiment of the present disclosure will be described with reference to FIGS. 1 to 4.

The vehicle braking system 1 is a system that decelerates or stops the speed of a vehicle being driven.

The vehicle braking system 1 allows or limits the rotation of the wheel cylinder by adjusting the braking force transmitted to the wheel cylinder of the wheel. In this case, the target braking force of the vehicle braking system 1 may be set differently according to the inclination of the vehicle. A detailed description thereof will be described later.

In the illustrated embodiment, the vehicle braking system 1 includes a driving part 10, a controller 20, an inclination sensor 30, a braking force calculator 40, and a warning signal transmitter 50.

The driving part 10 includes a motor 110 and a braking device 120.

The motor 110 provides power required for driving or the like of the vehicle. Conversely, the braking device 120 provides a braking force to a vehicle in driving.

The braking device 120 may decelerate the driving speed of the vehicle by allowing or limiting the rotation of the wheels of the vehicle.

The braking device 120 controls the braking hydraulic pressure transmitted to the wheel cylinder. Accordingly, a reciprocating movement of the wheel cylinder may be induced. As a result, it is possible to allow or limit the rotation of the vehicle wheels.

The controller 20 controls each component of the driving part 10. To this end, the controller 20 is electrically connected to the driving part 10.

In the illustrated embodiment, the controller 20 includes a motor controller 210 and a braking device controller 220.

The motor controller 210 and the braking device controller 220 are electrically connected to the motor 110 and the braking device 120, respectively.

The motor controller 210 and the braking device controller 220 respectively control the motor 110 and the braking device 120 so that the vehicle can travel at a target speed. The motor controller 210 and the braking device controller 220 compare the current speed and the target speed of the vehicle, and accelerate or decelerate the speed of the vehicle based on the comparison.

The braking device controller 220 controls the braking device 120 based on the measurement result of the inclination sensor 30 and the calculation result of the braking force calculator 40.

Figure 3:
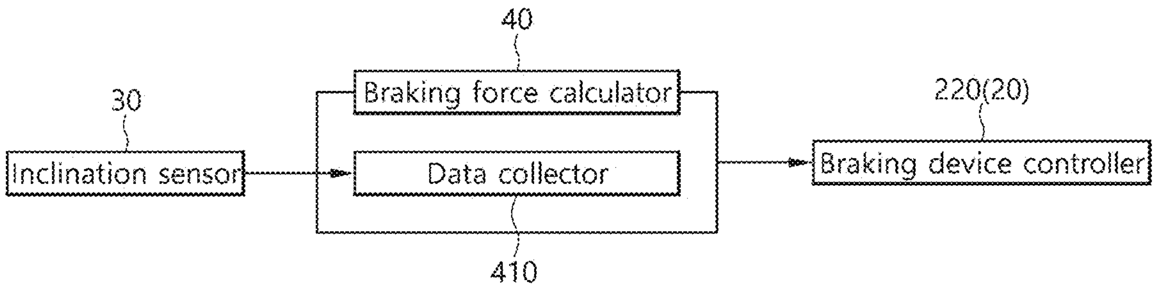
FIG. 3 is a schematic diagram illustrating an inclination sensor and a braking force calculator provided in the vehicle braking system of FIG. 1.

Hereinafter, the inclination sensor 30 and the braking force calculator 40 will be described with reference to FIG. 3.

The inclination sensor 30 measures the inclination of the vehicle and transmits it to the braking force calculator 40. To this end, the inclination sensor 30 is electrically connected to the braking force calculator 40.

The braking force calculator 40 calculates a target braking force corresponding to the inclination measurement result. Thereafter, the braking force calculator 40 transmits the calculation result to the braking device controller 220. The braking device controller 220 controls the braking device

120 based on the calculation result. To this end, the braking device controller 220 is electrically connected to the braking force calculator 40.

In the illustrated embodiment, the braking force calculator 40 includes a data collector 410. The data collector 410 is electrically connected to the inclination sensor 30 and receives a measurement result of the inclination sensor 30.

The braking force calculator 40 compares a measurement value of the inclination sensor 30 with a preset reference value, and sets a target braking force of the braking device 120 based on the comparison. In an embodiment, the preset reference value may be 7% or more and 9% or less, preferably 8%.

In an embodiment, when the measurement value of the inclination sensor 30 is equal to or less than the preset reference value, the braking force calculator 40 sets the target braking force to a preset maximum value. On the contrary, when the measurement value of the inclination sensor 30 is greater than the preset reference value, the braking force calculator 40 sets the target braking force in proportion to the measurement value.

When the inclination sensor 30 fails to measure the inclination of the vehicle, the braking force calculator 40 sets the target braking force to a preset maximum value, and the braking device controller 220 allows the braking device 120 to reapply a braking force to the vehicle.

Therefore, even in a highly inclined situation or a situation where it is difficult to measure the inclination, sufficient braking force can be applied to the vehicle. Accordingly, a safety accident can be prevented during a braking process of the vehicle in which the inclination measurement is not possible. As a result, it is possible to safely brake the vehicle in various inclined situations.

In addition, separately from the braking force calculator 40, when the inclination sensor 30 fails to measure the inclination, the warning signal transmitter 50 may be started.

Figure 4:
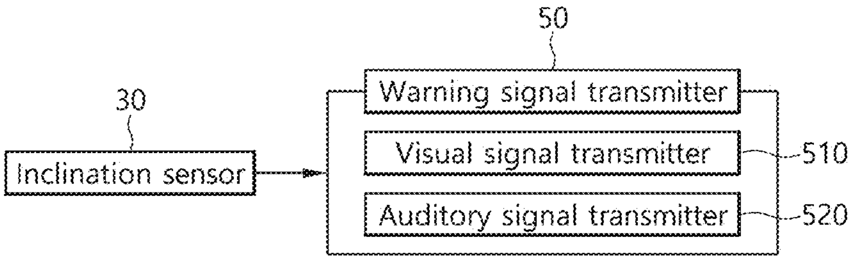
FIG. 4 is a schematic diagram illustrating a warning signal transmitter provided in the vehicle braking system of FIG. 1.

Hereinafter, the warning signal transmitter 50 will be described with reference to FIG. 4.

When the inclination sensor 30 fails to measure the inclination of the vehicle, the warning signal transmitter 50 outputs a warning signal to the outside. To this end, the braking warning signal transmitter 50 is electrically connected to the inclination sensor 30.

In the illustrated embodiment, the warning signal transmitter 50 includes a visual signal transmitter 510 and an auditory signal transmitter 520.

The visual signal transmitter 510 and the auditory signal transmitter 520 may output a visual signal and an auditory signal to the outside, respectively.

Therefore, when an unusual situation such as a malfunction of the inclination sensor 30 occurs, the unusual situation can be quickly transmitted to the driver. Further, the occurrence of an accident due to the unusual situation can be prevented.

In an embodiment, when the inclination sensor 30 fails to measure the inclination of the vehicle, the warning signal transmitter 50 may output a warning signal from at least one of the visual signal transmitter 510 and the auditory signal transmitter 520.

Figure 5:
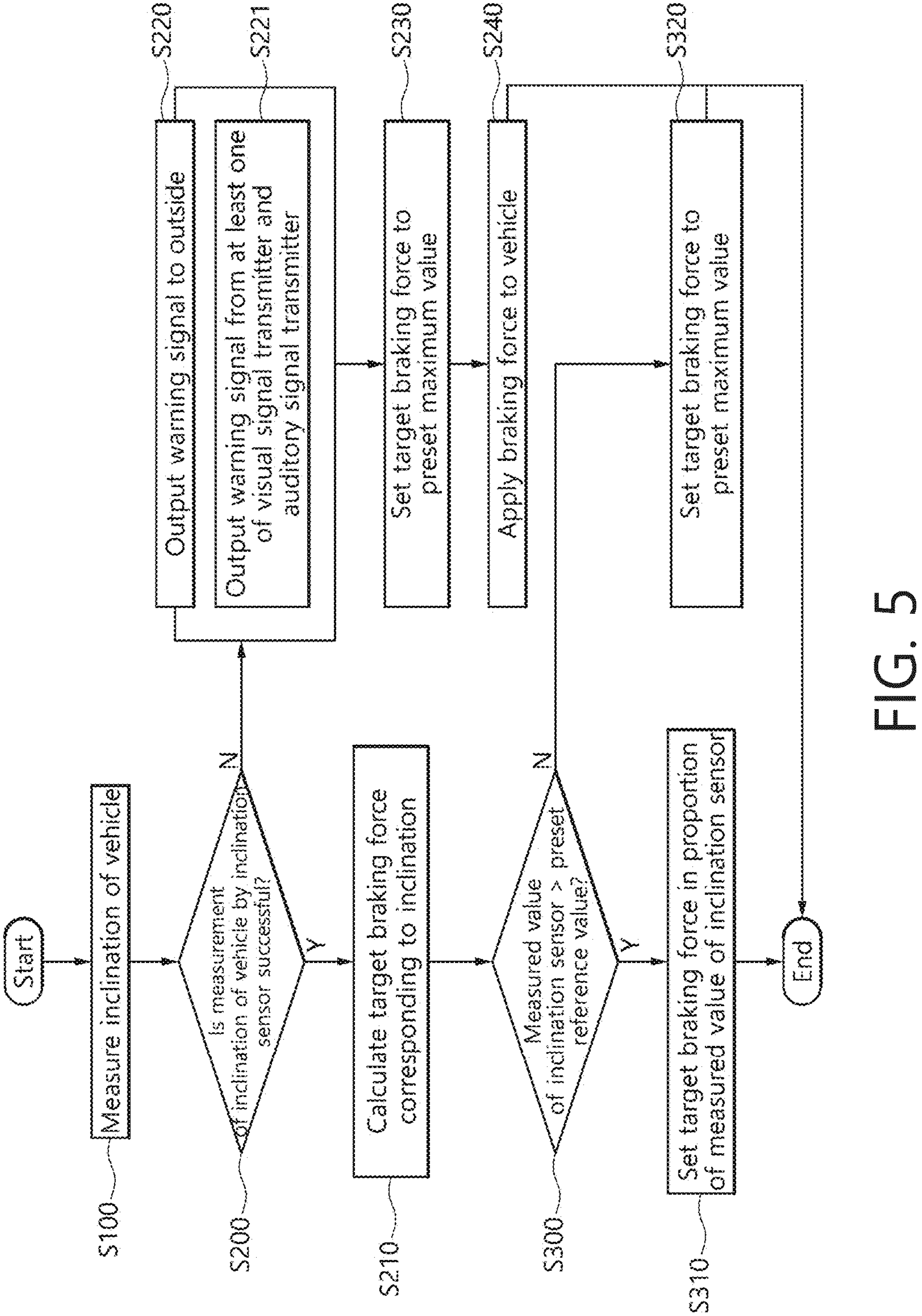
FIG. 5 is a flowchart illustrating a control method of a vehicle braking system according to an exemplary embodiment of the present disclosure.

In the above, the vehicle braking system 1 according to an embodiment of the present disclosure has been described. Hereinafter, a method for controlling the vehicle braking system 1 according to an exemplary embodiment of the present disclosure will be described with reference to FIG. 5.

The method for controlling the vehicle braking system 1 according to an embodiment of the present disclosure includes measuring, by the inclination sensor 30, an inclination of the vehicle at step S100 and determining whether the inclination sensor 30 has successfully measured the inclination of the vehicle at step S200.

First, the inclination sensor 30 measures the inclination of the vehicle. Thereafter, the inclination sensor 30 transmits the measured inclination to the braking force calculator 40. During this process, the braking force calculator 40 and the warning signal transmitter 50 determine whether the inclination sensor 30 has successfully measured the inclination of the vehicle.

When the inclination sensor 30 succeeds in measuring the inclination of the vehicle, the braking force calculator 40 calculates a target braking force corresponding to the inclination at step S210 and determines whether the measured value of the inclination sensor 30 is greater than a preset reference value at step S300.

When the measured value of the inclination sensor 30 is greater than the preset reference value, the braking force calculator 40 sets the target braking force in proportion to the measured value of the inclination sensor 30 at step S310.

On the contrary, when the measured value of the inclination sensor 30 is equal to or less than the preset reference value, the braking force calculator 40 sets the target braking force to a preset maximum value at step S320.

If the inclination sensor 30 has failed to measure the inclination of the vehicle at the step S200 of determining whether the inclination sensor 30 has successfully measured the inclination of the vehicle, the warning signal transmitter 50 outputs a warning signal to the outside at step S220 when the inclination sensor 30 fails to measure the inclination of the vehicle.

Therefore, when an unusual situation such as a malfunction of the inclination sensor 30 occurs, the unusual situation can be quickly transmitted to the driver.

In an embodiment, when the inclination sensor 30 fails to measure the inclination of the vehicle, the step in which the warning signal transmitter 50 outputs a warning signal to the outside at step S220 may include a step of outputting a warning signal from at least one of the visual signal transmitter 510 and the auditory signal transmitter 520 at step S221.

In addition, when the inclination sensor 30 fails to measure the inclination of the vehicle, the braking force calculator 40 sets the target braking force to a preset maximum value at step S230 and the braking device 120 reapplies a braking force to the vehicle at step S240.

Therefore, even in a highly inclined situation or a situation where it is difficult to measure the inclination, sufficient braking force can be applied to the vehicle.

Although the present disclosure has been described above with reference to preferred exemplary embodiments thereof, the present disclosure is not limited to the configurations of the above-described embodiments.

In addition, the present disclosure may be variously modified and changed without departing from the idea and scope of the present disclosure described in the following claims by those skilled in the art to which the present disclosure pertains.

Furthermore, the embodiments may be configured by selectively combining all or some of the embodiments so that various modifications may be made thereto.

What is claimed is:

1. A vehicle braking system, comprising:

a braking device configured to apply a braking force to a vehicle;

an inclination sensor configured to measure an inclination of the vehicle; and a braking force calculator configured to calculate a target braking force corresponding to the inclination, wherein when the inclination sensor fails to measure the inclination of the vehicle, the braking force calculator sets the target braking force to a preset maximum value, and the braking device reapplies a braking force to the vehicle, and wherein when the inclination sensor measures the inclination, the braking force calculator compares a measured value of the inclination sensor with a preset reference value, and when the measured value is equal to or less than the preset reference value, the braking force calculator sets the target braking force to the preset maximum value.

2. The vehicle braking system of claim 1, wherein when the measured value of the inclination sensor is greater than the preset reference value, the braking force calculator sets the target braking force in proportion to the measured value.

3. The vehicle braking system of claim 1, wherein the preset reference value is 7% or more and 9% or less.

4. The vehicle braking system of claim 1, further comprising a warning signal transmitter configured to output a warning signal to the outside when the inclination sensor fails to measure the inclination of the vehicle.

5. The vehicle braking system of claim 4, wherein the warning signal transmitter comprises a visual signal transmitter configured to output a visual signal.

6. The vehicle braking system of claim 4, wherein the warning signal transmitter comprises an auditory signal transmitter configured to output an auditory signal.

7. The vehicle braking system of claim 1, further comprising a control device controller configured to control the braking device such that when a current speed of the vehicle is greater than a target speed, the speed of the vehicle is decelerated so that the vehicle can be driven at the target speed.

8. The vehicle braking system of claim 1, further comprising:

a motor configured to provide power required for driving of the vehicle; and a motor controller configured to control the motor such that the vehicle can be driven at a target speed by accelerating or decelerating the speed of the vehicle.

9. A method for controlling a vehicle braking system, comprising:

(a) measuring, by an inclination sensor, an inclination of a vehicle;

(b) calculating, by a braking force calculator, a target braking force corresponding to the inclination;

(c) when the inclination sensor fails to measure the inclination of the vehicle, setting, by the braking force calculator, the target braking force to a preset maximum value; and (d) reapplying, by a braking device, a braking force to the vehicle, wherein the step (b) comprises: (b0) comparing a measured value of the inclination sensor with a preset reference value; and (b1) when the measured value is equal to or less than the preset reference value, setting the target braking force to the preset maximum value.

10. The method for controlling a vehicle braking system of claim 9, wherein before the step (a), (a01) providing, by a motor, power to the vehicle so that the vehicle can be driven at a target speed.

11. The method for controlling a vehicle braking system of claim 9, wherein before the step (a), (a02) decelerating, by the braking device, a speed of the vehicle when a current speed of the vehicle is greater than a target speed.

12. The method for controlling a vehicle braking system of claim 9, wherein the step (b0) comprises:

(b2) setting, by the braking force calculator, the target braking force in proportion to the measured value when the measured value of the inclination sensor is greater than the preset reference value.

13. The method for controlling a vehicle braking system of claim 9, wherein the preset reference value of the step (b0) is 7% or more and 9% or less.

14. The method for controlling a vehicle braking system of claim 9, wherein the step (c) comprises:

(c1) outputting, by a warning signal transmitter, a warning signal to the outside.

15. The method for controlling a vehicle braking system of claim 14, wherein the step (c) comprises:

(c01) outputting, by a visual signal transmitter, a visual warning signal.

16. The method for controlling a vehicle braking system of claim 14, wherein the step (c) comprises:

(c02) outputting, by an auditory signal transmitter, an auditory warning signal.

* * * * *